S. A. CLEMENS.
Hemp Brake.
No. 8,218.
Patented July 15, 1851.
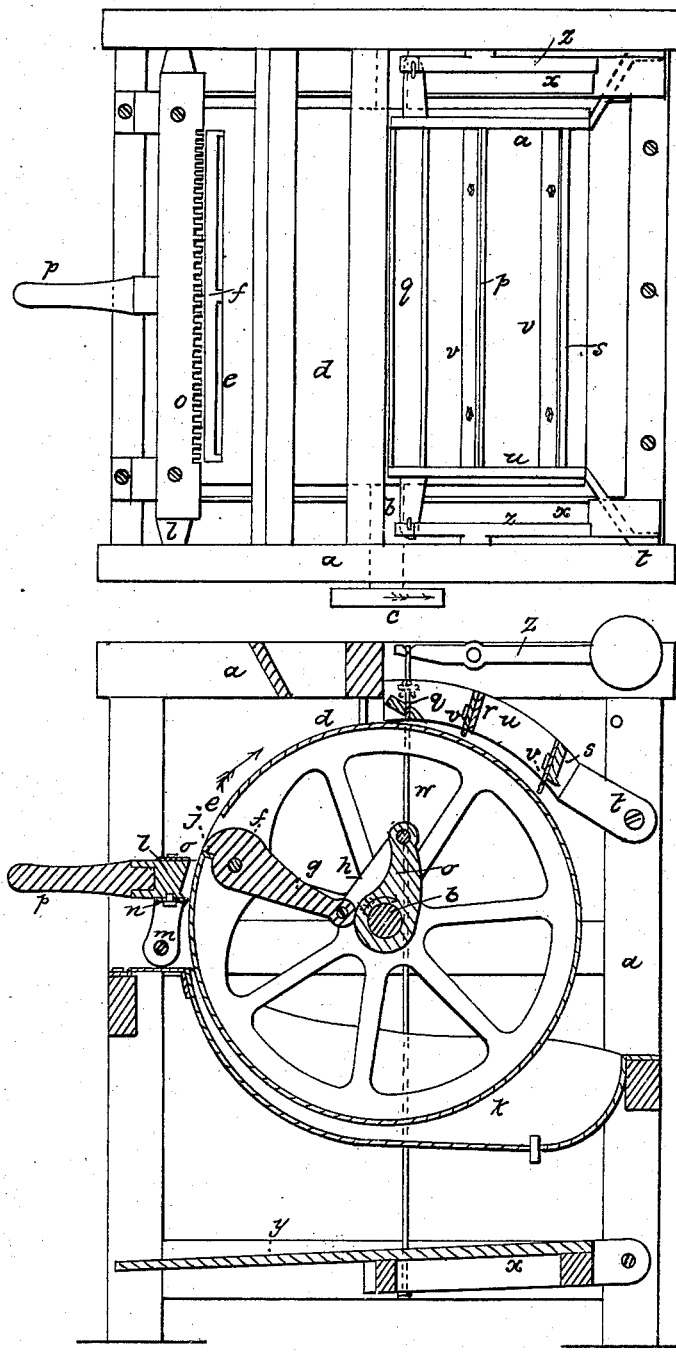

UNITED STATES PATENT OFFICE.

S. A. CLEMENS, OF SPRINGFIELD, MASSACHUSETTS.

IMPROVEMENT IN MACHINES FOR DRESSING SISAL HEMP, &c.

Specification forming part of Letters Patent No. 8,218, dated July 15, 1851.

*To all whom it may concern:*

Be it known that I, STILLMAN ALLEN CLEMENS, of Springfield, Massachusetts, have invented a new and useful Machine for Dressing Sisal Hemp, Manila Grass, and other like Fibrous Substances; and I do hereby declare that the following is a full, clear, and exact description thereof, reference being had to the accompanying drawings, making part of this specification, in which—

Figure 1 is a plan, and Fig. 2 a vertical section.

The same letters indicate like parts in both figures.

Sisal hemp and Manila grass and other fibrous tropical plants of like character are usually dressed in the green state, the better to separate the outer coating of the leaf and to remove the pulpy from the fibrous matter.

In dressing Sisal hemp the best mode of procedure is to divide each leaf into two parts by making an incision at the butt-end in a line along the middle of its thickness.

The machine which I have invented for the purpose of dressing the fibers of these plants consists of a large cylinder rotated by any adequate power and turning freely on its shaft. At one part of its circumference a slot is made through its periphery, and extending nearly its whole length, to receive the butt-ends of the leaves, which are there held by what may be termed a "self-acting clamp," one edge of the slot constituting one jaw, the other jaw being jointed by journal-pins to the ends of the cylinder, and so connected with the driving-shaft of the cylinder that the power applied to turn the cylinder shall operate entirely through these connections, thus making use of the driving-power to clamp and hold the leaves and fibers while being dressed. The lower part of the periphery of the cylinder runs in a vat of water, through which the fibers are carried during the process of dressing by the rotation of the cylinder. Scraping-knives and combs, to remove the pulp and separate the fibers, are attached to beams with levers or handles, and so hinged to the frame that as the cylinder rotates the operative, with his hands and feet, can apply the knives and combs to the surface of the leaves.

In the accompanying drawings, $a$ represents a suitable frame, and $b$ a horizontal driving-shaft, provided at one end with a driving-pulley, $c$, or crank-handle, or any other desirable means for applying the driving-power. On this shaft is hung a cylinder, $d$, of such diameter that its circumference shall be at least equal to the length of the fibrous plants to be dressed. This cylinder is free to turn on the shaft, and is held in place on the shaft in any of the modes known to machinists. At $e$ there is a slot cut through the periphery of the cylinder and extending from head to head, and within this slot is hung a hinged jaw, $f$, the journals of which turn in the heads of the cylinder. This hinged jaw has an arm, $g$, extending inward, the inner end of which is connected by a joint-link, $h$, to an arm, $i$, on the shaft, so that when the shaft is rotated in the direction of the arrow the jaw $f$ is forced against the edge $j$ of the slot, which constitutes the other jaw of a self-acting clamp, to hold the butt-ends of the leaves to be dressed. It is through this clamp and its connections that the driving-power is communicated from the driving-shaft to the cylinder. Below the cylinder is hung a vat or pan, $k$, to hold water, through which the leaves and fibers, in the process of dressing, are carried by the rotation of the cylinder, to be kept in a moist state, as being most favorable to the operation of dressing, and to wash from the fibers the juice of the plant, by which the quality of the staple is much improved. In front of the cylinder there is a bar, $l$, jointed to the frame at $m$, and to which is attached at bottom a scraping-knife, $n$, and at top a comb, $o$. This bar is provided with a handle, $p$, by means of which the operative can move the knife and comb toward or from the surface of the cylinder. Above the cylinder, and a little back of the central line, there are three bars, $q\,r\,s$, connected together and jointed to the frame at $t\,t$ by means of two arms, $u\,u$. The bar $q$ is for the purpose of laying the fibers on the surface of the cylinder. To the bars $r$ and $s$ are secured scraping-knives $v\,v$, similar to the knife $n$ on the bar $l$. The arms $u\,u$ are connected by rods $w$ with a hinged frame, $x$, at bottom, having a treadle, $y$, by which the operative can force the bar $q$ and knives $v\,v$ toward the surface of the cylinder, and for the purpose of lifting them from the cylinder the arms $u\,u$ are suspended to levers $z\,z$, with counter-weights on their outer ends.

For the purpose of operating, the attendant stops the cylinder and inserts the butt-ends of one or more leaves into the jaws of the clamp, with the split surface downward. The shaft is then started, which causes the movable jaw to grip the leaves and to carry around the cylinder, and with it the leaves which they thus infold, and by the continual rotation the leaves are brought in succession under the action of the bar $q$, to be laid smooth on the surface of the cylinder, then under the knives $v\ v$, through the water, and then under the knife $n$ and the comb $o$, these being applied by any degree of force required by the operative, who continues the operation until all foreign substances have been removed and the fibers have been separated by the comb. The shaft is then stopped, which opens the jaw to discharge the dressed fibers and to receive another batch of leaves.

I have found that the combs and water can be dispensed with, and therefore do not wish to confine myself to the use of all the parts of my invention together, as parts may be omitted; but the best result is realized by the use of water in process of dressing Sisal hemp, and the combs are useful in separating the fibers.

What I claim as my invention, and desire to secure by Letters Patent, is—

1. The hinged jaw connected with the driving-shaft, substantially as described, in combination with the cylinder, to which it is hinged, and provided with a corresponding jaw, substantially as described, whereby the driving-power, in carrying around the substances to be dressed, clamps and holds them firmly during the entire operation, as described.

2. In combination with the cylinder and clamp for presenting and carrying around the substances to be dressed, as described, the knives and combs attached to one or more hinged bars, and provided with the necessary means for operating them, substantially as described.

3. In combination with the cylinder, as described, the vat of water, in which at each rotation of the cylinder the substances to be dressed are immersed, substantially as described, and for the purpose specified.

S. A. CLEMENS.

Witnesses:
C. O. CHAPIN,
E. B. RICHARDSON.